US007961247B2

(12) United States Patent
Tatarczyk

(10) Patent No.: US 7,961,247 B2
(45) Date of Patent: Jun. 14, 2011

(54) APPARATUS FOR ACQUIRING AN IMAGE OF A PREDETERMINED EXTRACT OF A MOVING PRINTED PRODUCT

(75) Inventor: Theodor Tatarczyk, Gröbenzell (DE)

(73) Assignee: manroland AG, Offenbach (am main) (DE)

( * ) Notice: Subject to any disclaimer, the term of this patent is extended or adjusted under 35 U.S.C. 154(b) by 1532 days.

(21) Appl. No.: 11/042,387

(22) Filed: Jan. 25, 2005

(65) Prior Publication Data

US 2006/0001924 A1 Jan. 5, 2006

(30) Foreign Application Priority Data

Jan. 25, 2004 (DE) ......................... 10 2004 003 613

(51) Int. Cl.
*H04N 5/225* (2006.01)
*H04N 5/222* (2006.01)
*H04N 1/46* (2006.01)

(52) U.S. Cl. ................... 348/370; 348/207.99; 358/504; 358/509

(58) Field of Classification Search .................. 348/370, 348/371, 294, 280, 207.99; 358/504, 509; 356/406, 420
See application file for complete search history.

(56) References Cited

U.S. PATENT DOCUMENTS 4,636,081 A * 1/1987 Saitoh et al. .................. 356/420
5,724,259 A 3/1998 Seymour et al.
5,750,985 A * 5/1998 Suzuki .................... 348/E3.027
5,854,680 A * 12/1998 Rakitsch ........................ 356/406
6,538,770 B1 * 3/2003 Mestha ......................... 358/504
6,633,382 B2 * 10/2003 Hubble et al. ................ 356/402
6,671,052 B1 * 12/2003 Rushing ........................ 356/446
6,894,262 B2 * 5/2005 Gao et al. ................... 250/208.1
2001/0017649 A1 * 8/2001 Yaron ............................. 348/45
2001/0028047 A1 * 10/2001 Isoda ............................ 250/586

FOREIGN PATENT DOCUMENTS

DE 195 11 782 C2 10/1996
DE 196 17 009 C2 5/1999
DE 195 38 811 C2 11/2002

* cited by examiner

*Primary Examiner* — Nhan T Tran
(74) *Attorney, Agent, or Firm* — Leydig, Voit & Mayer, Ltd.

(57) ABSTRACT

An apparatus and method for acquiring an image of a predetermined extract of a moving printed product employs at least one black-and-white camera with a two-dimensional electronic image sensor and one or more illumination devices suitable for pulse-like illumination. The illumination device has multiple light sources forming spectral groups that have different spectral compositions. The light sources are arranged in a pattern such that the light sources of each spectral group completely illuminate the area of observation of the camera. A control device switches the individual spectral groups of light sources on and off sequentially such that the area of observation of the camera is illuminated with a sequence of light pulses of different spectral compositions. During each light pulse, the predetermined extract on a printed product moves into the area of observation of the camera, and an image of extract is captured.

18 Claims, 4 Drawing Sheets

APPARATUS FOR ACQUIRING AN IMAGE OF A PREDETERMINED EXTRACT OF A MOVING PRINTED PRODUCT

FIELD OF THE INVENTION

The invention relates to an apparatus for acquiring an image of a predetermined extract of a moving printed product, and to a method of operating such an apparatus.

BACKGROUND OF THE INVENTION

For the purpose of process monitoring during printing, it is usual to provide printed control strips with colored test patterns outside the subject on sheets or webs to be printed. These control strips, whose longitudinal direction is transverse with respect to the transport direction of the printing material, contain a set of measurement areas which repeat periodically in the longitudinal direction, on each of which a specific characteristic variable that characterizes the printing quality can be measured. An image of at least part of the control strip is acquired and evaluated during the movement of the printed product to be examined in the press. As an alternative to a control strip provided specifically for the purpose, in principle a portion of the printed useful area of the printing material can also be recorded and evaluated.

DE 195 38 811 C2 describes an apparatus of the generic type in which a digital image of part of a control strip is recorded by an electronic camera as the control strip moves through the area of observation of the camera. Flash lamps, which are either gas discharge lamps or incandescent lamps, are provided for the purpose of broadband illumination of the control strip during its presence in the area of observation of the camera. In order to permit color-selective evaluation of the image, a color camera is used. By means of a color-selective beam splitter, the different spectral components of the light falling into the camera are distributed to three different image sensors, one each for the red, green and blue spectral ranges. Color cameras of this type have a complicated structure and are accordingly costly. In addition, they are inferior to black-and-white cameras in terms of sensitivity. Furthermore, each color camera has a predefined spectral sensitivity characteristic, which cannot be changed from the outside.

In the case of densitometers, DE 196 17 009 C2 discloses the concept of illuminating a measurement point sequentially in time with light-emitting diodes (LEDs) of different colors and receiving the reflected light by using a single optoelectronics sensor which is not color-selective, specifically a silicon photodiode. The signals recorded one after another during different illumination phases yield information about the spectral composition of the reflected light and therefore also about the color of the printing ink present at the measurement point. The densitometer described in the aforementioned reference is, however, designed for only an approximately point-like measurement, since the light from three light-emitting diodes of different colors is aimed at a single measurement point, either directly as a result of their arrangement or indirectly by means of optical waveguides. Furthermore, this densitometer is also provided only for measuring on a stationary printed product after its removal from a press, i.e., for offline operation, in which the duration of the individual illumination phases can be selected freely in order to utilize optimally the dynamic range of the sensor employed.

BRIEF SUMMARY OF THE INVENTION

The invention is based on the object of providing an apparatus for acquiring an image of a predetermined extract of a printed product during the movement of the latter in a press, which permits color information to be obtained with little outlay on apparatus. For this purpose, it is an object that the image acquiring device can be configured in a simple way so as to meet the requirement. A further object consists in specifying a method for the convenient operation of such an apparatus.

These objects are achieved by an apparatus and method of the invention. The apparatus according to the invention is distinguished by the fact that it uses a two-dimensional camera which is not color-selective and is combined with an illumination device that is able to illuminate the area of observation of the camera with light of different colors. For this purpose, the illumination device comprises a plurality of groups of light sources that project light into the area of observation of the camera. The light sources in the different groups produce different colors due to their emission characteristics and/or as a result of filtering in groups. The light sources are arranged in a pattern and located such that each group of a given color completely illuminates the entire area of observation. In the location pattern the light sources may, but not necessarily, be arranged with a periodicity. For example, the various illuminating colors could be implemented with different spacing, and the physical densities of the light sources may depend on the power of the light sources of each color.

The light sources can be activated sequentially in color groups by a control device. As a result, the area of observation of the camera can be illuminated with a sequence of light pulses of different colors. Information about the color composition of a pattern with which the extract is printed can be obtained from images recorded one after another during illumination of the same extract of a printed product with different colors. As a result, not only is the use of an expensive color camera avoided, the optical measuring system also becomes more powerful due to the higher sensitivity of a black-and-white camera. Furthermore, the spectral resolution of the measuring system can be matched specifically to the requirements of each use by selecting the number of light source groups and the spectral composition of the light of each group, without any intervention or adjustment in the camera being needed.

To match the strip shape of the control sections normally provided on a printed product, it is convenient if the individual light sources are arranged linearly beside one another in the form of a row and spaced equidistantly. Depending on the necessary number of the various groups of light sources and the physical density within each group, it may also be necessary to provide a two-dimensional arrangement comprising a plurality of rows. It is possible for the rows to be aligned relative to one another in the form of a matrix or else offset with respect to one another in the longitudinal direction. Using such an arrangement, certain measurement standards that demand specific irradiation angles can no longer be met exactly, but depending on the application it is not always necessary to meet such standards.

It is particularly advantageous if the arrangement pattern of the light sources of an illumination device is periodic and includes a whole number of complete periods, since such illumination devices can in principle be lined up in a row to form modularly constructed larger units, thereby continuing the periodicity of the light sources. Although such a periodicity is advantageous for reasons of simple fabrication, the invention is not limited to such an arrangement. For instance, it may be convenient to treat the edges of the irradiated area separately, by increasing the density of the light sources there, in order to implement an illumination intensity at the edge which does not drop off too sharply.

In the case of a row arrangement, a plurality of rows of light sources can radiate a given color from a plurality of directions into the area of observation of the camera, such as from opposite sides of the camera. In particular, the light sources may project light from the front and from the back in relation to the movement of the printing material. Illumination from different directions sorted by colors is possible. For example, red and blue lights may be projected from the front, and the green light with twice the density may be projected from the back.

By means of overlapping the cones of radiation from the individual light sources of each spectral group, the light intensity can be increased, and the uniformity of the illumination of the area of observation of the camera can be improved. In this way it is also possible to ensure that, in the event of failure of a single light source, the entire measuring system does not fail abruptly but instead can continue to be operated with a locally reduced light intensity. For example, during an ink density measurement, the light intensity reflected from a printed area of the printing material is related to a reference intensity which is reflected from an unprinted area. If the reference intensity is not measured globally but rather in a location-dependent manner, a local reduction in the irradiated intensity has at most an influence on the achievable accuracy of the ink density determination. The local reduction in the reference intensity in this case even permits the detection of the failure of a light source. The minimum extent of overlap is provided by having each point of the area of observation of the camera illuminated directly by two individual light sources of each spectral group.

Since the intrinsic spectral emission characteristics of available light sources do not normally correspond to the relevant standards for the determination of the characteristic variables of printed products of interest, in particular the ink density, it may be necessary to put color filters in front of the light sources to bring about a desired spectral composition of the irradiated light for each light source.

If, because of the space required, it is not possible to arrange the light sources of all the different spectral groups alternately beside one another, there is the possibility of deflecting the beams of various light colors coming from different directions through one or more color-selective beam splitters into approximately the same direction towards the area of observation of the camera.

Because of their small dimensions, light-emitting diodes (LEDs) are particularly well-suited as light sources to achieve a high packing density, which allows a high level of mutual overlapping of the individual radiation cones of the light sources. This provides a high degree of redundancy and therefore security against failure, as well as homogeneous and intensive illumination of the area of observation of the camera. In addition to conventional light-emitting diodes, laser diodes are also suitable as light sources. Furthermore, gas discharge lamps and halogen incandescent lamps are in principle also suitable as light sources, and it is possible for halogen light sources to be used with a shutter in the camera to implement sufficiently short illumination times.

By using imaging optics for focusing the light from the light sources onto the area of observation of the camera, the working distance between the illumination device and the printed product can be increased. This is of interest in particular for application of inline measurement in sheet-fed presses, since a relatively large working distance is necessary there because of the type of movement of the printing material. Given an elongated arrangement of the light sources in the form of rows, cylindrical lenses are recommended in order to save effort in implementing the imaging optics. For a large number of light sources, only a single cylindrical lens or possibly a few cylindrical lenses in series are needed in the beam path. The lens or lenses should extend for a sufficient distance in the direction of the longest dimension of the arrangement of light sources, which in the case of a row is the longitudinal direction of the row. The number of different optical components which have to be adjusted in relation to each other therefore remains small.

A modular combination of a plurality of illumination devices may be made to form a larger illumination unit. To that end, it is advantageous if the housings of the individual illumination devices and the holders of their optical components are configured in such a way that when illumination devices of the same type are lined up laterally in a row the optical components of the individual illumination devices adjoin one another without any significant gaps. This includes, for example, configuring the housing and the holder of the imaging optics so that they do not interfere with or even block the light entry and exit from a possible adjacent module, in order not to interrupt the overlapping of the cones of light from the light sources in the transition region. Also, side walls of the housing should be designed to be sufficiently thin or removable, so that the suitable spacing of the light sources can be maintained even in the transition region. In the case of a periodic arrangement of light sources, this means that the periodicity is preserved in the transition region.

To acquire an image of a narrow control strip, which extends over virtually the entire width of a printed product and transversely with respect to its direction of motion, it is convenient to line up camera modules linearly in a row so that their areas of observation are adjoining one another either without any gaps or overlapping slightly, so as to result in an overall coherent area of observation. The entire area of observation of such a combined camera arrangement can be conveniently illuminated using an appropriate combination of modular illumination devices that likewise adjoin one another without any significant gaps. To preserve the homogeneity of the illumination along the entire area of observation of the camera arrangement, it is necessary for the patterns of the light sources of different colors of each illumination device to be continued without disruption by being lined up in a row. In the case of a periodic pattern, this means continuing the periodicity. Furthermore, in this case, synchronous activation of the individual illumination devices is necessary, that is to say all the light sources of a spectral group in all the illumination devices have to be switched on and off at the same time. Lining up identical illumination devices modularly in a row to form a larger unit does not necessarily assume a corresponding modular camera arrangement, however. Instead, it can also be useful for illuminating the area of observation of a single camera, if the latter has a sufficiently great length.

A second aspect of the invention is directed to a method which makes use of the apparatus according to the invention. The method includes sequential activation of the individual groups of light sources for illuminating the area of observation of the camera with light pulses of alternate spectral composition in order to record images of a predetermined extract of a printed product just located in the area of observation.

In this case, the spectral composition of the light pulses may also be set by means of simultaneous activation of different spectral groups of light sources, but it is preferred always to activate only a single group of light sources at each time.

If the printed product is moving very quickly, it can be difficult or even impossible to activate all the different spectral groups of light sources one after another and to acquire an image for each of the colors while the same copy of the predetermined extract of interest on the printed product is present in the area of observation of the camera. However, this is not a problem as it is not necessary to capture images for all the colors on the same copy. Instead, it appears to be sufficient for the monitoring and control of a printing process, if only a single image under a single type/color of illumination is recorded from each copy of the extract, and the illumination colors during the presence of successive copies of the extract of interest alternate periodically, so that different colors are acquired on different successive copies. This procedure is based on the assumption that the characteristic variables of interest relating to a printed product, such as the ink density, do not change noticeably between a few successive copies of a measured structure, such as a control strip. In other words, the time constants of the processes critical to such changes are large as compared with the time interval between the presence of successive copies in the area of observation of the camera. In this regard, it is also not necessary to record an image during each presence of a copy of the control strip in the observation area. Instead, it is possible to leave out copies if their time interval is too short in relation to the period for reading and processing an image.

In order to achieve light pulses of high intensity by using light-emitting diodes, it is advantageous to apply current pulses to the diodes at levels which are a multiple of the permissible maximum current for the continuous operation of the light-emitting diodes. As long as these pulses are sufficiently short that thermal overloading does not occur in the process, light-emitting diodes can readily cope with such pulsed operation. A guideline for the extent of such overdriving, which leads to a substantially higher light yield without damaging the light-emitting diodes, is five times the permissible maximum current in continuous operation.

In the following text, an exemplary embodiment of the invention will be described by using the drawings, in which:

DETAILED DESCRIPTION OF THE INVENTION

Figure 1:
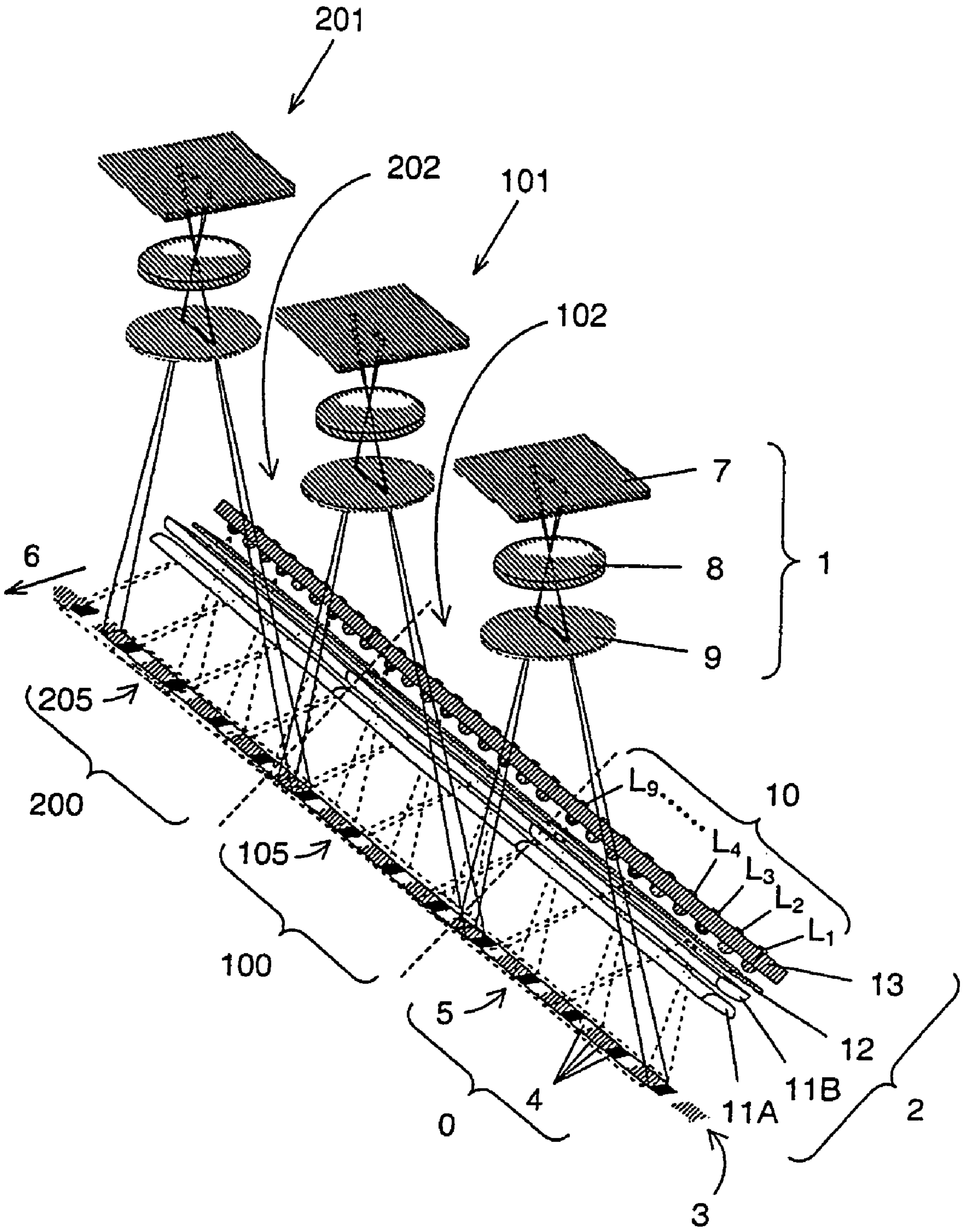
FIG. 1 shows a simplified perspective view of the substantial optical components of an embodiment of the apparatus according to the invention.

FIG. 1 shows in a simplified form the optical components of a preferred embodiment of the apparatus according to the invention, namely an electronic camera 1 and an associated illumination device 2. In this case, a plurality of identical cameras 1, 101 and 201 and a plurality of illumination devices 2, 102 and 202, respectively, assigned thereto are lined up modularly in a row. This possibility of combining a plurality of modules 0, 100 and 200, each comprising a camera and an illumination device, to form a larger unit is a particularly advantageous property of the invention. Initially, however, the construction of a single module and its functioning will be explained by using the module 0, which comprises the camera 1 and the illumination device 2.

The camera 1 is intended to record an image from a predetermined extract of a printed product, for example from a control strip 3 having a large number of periodically repeating measurement areas 4, while the control strip 3 is moving through an area of observation 5 of the camera 1, which is likewise strip-like in this case and shown dashed in FIG. 1. The direction of motion of the control strip 3 is indicated by the arrow 6 in FIG. 1.

In accordance with a feature of the invention, the camera 1 is a black-and-white camera having a two-dimensional image sensor 7. The image acquired by the image sensor 7 comprises a rectangular matrix of image points or pixels, for each image point an electrical signal being output which is a measure of the intensity of the incident light. An objective lens 8 is provided for the reduced projection of the area of observation 5 onto the image sensor 7. A polarization filter 9 can also be arranged in front of the objective lens 8. If the area of observation 5 is a narrow elongated strip, then it is not the entire active area, but rather only a relatively narrow strip, of the rectangular image sensor whose length/width ratio is normally not excessively large, that is needed to record the area of observation 5. In this case, after an image has been recorded, only such a strip has to be read out from the image sensor 7. In addition, the beam path can also be narrowed appropriately by parts of the housing of the camera 1 not illustrated in FIG. 1, so that only light from the intended area of observation 5 can reach the image sensor 7.

In order to illuminate the area of observation 5 of the camera 1 during the presence there of a copy of the control strip 3, an illumination device 2 is provided. It is intended to emit a short light pulse at the correct instant to permit a momentary recording of the control strip 3 by the camera 1. In a preferred embodiment, the illumination device 2 has a large number of individual light sources 10 in the form of light-emitting diodes (LEDs) $L_1$ to $L_9$, which are arranged equidistantly, linearly and periodically adjacent one another and are aimed at the area of observation 5. In this case, the longitudinal direction of the row formed by the light-emitting diodes $L_1$ to $L_9$ runs parallel to the longitudinal direction of the area of observation 5.

In order to be able to obtain color information with the black-and-white camera 1, the illumination device 2 contains a plurality of groups of light sources 10, each group having a different spectral emission characteristic. For example, three different groups $L_1$-$L_4$-$L_7$, $L_2$-$L_5$-$L_8$ and $L_3$-$L_6$-$L_9$ of light-emitting diodes $L_1$ to $L_9$ with the emission colors red, green and blue can be provided to permit the density measurement of the printing inks cyan, magenta and yellow by using appropriately differently printed measurement areas 4 of the control strip 3. For this purpose, the control strips are illuminated sequentially by the red group $L_1$-$L_4$-$L_7$, the green group $L_2$-$L_5$-$L_8$ and the blue group $L_3$-$L_6$-$L_9$ of the light-emitting diodes $L_1$ to $L_9$ and, during each illumination, an image of the control strip 3 is recorded by the camera 1. The determination of the ink density of the printing ink cyan is then performed by using the measurement areas 4 printed in this way in the image recorded during the illumination with red light. The corresponding determinations of the densities of the printing inks magenta and yellow are carried out in a manner analogous to this by using the measurement areas 4 in each case printed in this way separately from one another in the images recorded during the illuminations with green and blue light, respectively.

The light-emitting diodes $L_1$ to $L_9$ are therefore not all activated simultaneously but one after another in groups in the manner of pulses. This results in the necessity for the area of observation 5 to be illuminated completely on its own by each individual spectral group $L_1$-$L_4$-$L_7$, $L_2$-$L_5$-$L_8$ or $L_3$-$L_6$-$L_9$ of the light-emitting diodes $L_1$ to $L_9$. In this case, the most uniform illumination possible is also desired, for which reason the light-emitting diodes $L_1$ to $L_9$ within each spectral group $L_1$-$L_4$-$L_7$, $L_2$-$L_5$-$L_8$ and $L_3$-$L_6$-$L_9$ form a regular periodic arrangement on their own and, within each group $L_1$-$L_4$-$L_7$, $L_2$-$L_5$-$L_8$ and $L_3$-$L_6$-$L_9$, the cones of light of two adjacent light-emitting diodes of each group $L_1$-$L_4$-$L_7$, $L_2$-$L_5$-$L_8$ and $L_3$-$L_6$-$L_9$ overlap in the longitudinal direction of the area of observation 5.

Thus, in the illustrated embodiment, the light sources are divided into three spectral groups of the emission colors red, green and blue, the first light-emitting diode $L_1$ is red, the second $L_2$ is green, the third $L_3$ is blue, the fourth $L_4$ is red again, and so on. To allow identical modules 0, 100 and 200 to be lined up in a row, it is necessary for the illumination device 2 to contain a whole number of complete periods of each spectral group $L_1$-$L_4$-$L_7$, $L_2$-$L_5$-$L_8$ and $L_3$-$L_6$-$L_9$. In the example assumed having the three colors red, green and blue, the arrangement of the light-emitting diodes $L_1$ to $L_9$ ends with a blue light-emitting diode $L_9$. The mutual overlapping of the cones of radiation from the light sources 10 of each given spectral group $L_1$-$L_4$-$L_7$, $L_2$-$L_5$-$L_8$ or $L_3$-$L_6$-$L_9$ in the longitudinal direction of the area of observation 5 is sketched in FIG. 1 by using the blue light-emitting diodes $L_3$, $L_6$ and $L_9$ as an example.

It should be noted that the number of three spectral groups is meant only as an example, just like the number of three periods from which, by multiplication, a total number of nine light-emitting diodes $L_1$ to $L_9$ results. Furthermore, for reasons of the lower light yield, one group of the light sources (10) could be arranged with a higher physical density than the other or even each of the groups of corresponding density in terms of the light yield, so that although the arrangement of light sources (10) would still have a pattern, it would have no periodicity of the type previously described.

For reasons of clarity, the sketched overlap does not have the actually preferred extent, however. To prevent a total failure of a measurement function in the event of failure of a single light-emitting diode $L_1$ to $L_9$, each point of the area of observation 5 preferably is irradiated directly by at least two light-emitting diodes $L_1$ to $L_9$ of the same color. In fact, it is even preferred for each point to be irradiated directly by at least three light-emitting diodes $L_1$ to $L_9$ of the same color.

In order to focus the light emitted by the light-emitting diodes $L_1$ to $L_9$ onto the area of observation 5 of the camera 1, imaging optics comprising two cylindrical lenses 11A and 11B are provided. It is possible for the number of cylindrical lenses following one another in the beam path to vary as a function of the requirement. It is advantageous in this case that a dedicated lens system is not needed for each individual light-emitting diode $L_1$ to $L_9$, but only a single one which extends in one piece along the entire row of light sources 10. It would also be conceivable for each cylindrical lens 11A and 11B to be assembled from a few identical parts lined up flush in a row, as long as the number of these parts was substantially lower than the number of individual light sources 10. As compared with a dedicated lens system for each individual light source 10, this would still mean a certain saving in costs. However, a single-piece design of each lens 11A, 11B of the imaging optics is particularly preferred.

Between the light-emitting diodes $L_1$ to $L_9$ and the imaging optics 11A, 11B there is a filter arrangement 12, which is needed in order to match the spectral composition of the light shone onto the control strip 3 to the standards applicable to the intended measurements, since the emission characteristics of available light-emitting diodes do not as a rule correspond exactly to these standards, at least not adequately. It goes without saying that, for each group $L_1$-$L_4$-$L_7$, $L_2$-$L_5$-$L_8$ and $L_3$-$L_6$-$L_9$ of light-emitting diodes $L_1$ to $L_9$, a respective suitable filter type is needed. Thus, in the filter arrangement 12, different types of filters each with a different transmission range alternate periodically in a manner analogous to the different emission colors of the light-emitting diodes $L_1$ to $L_9$. The filter arrangement 12 accordingly comprises a carrier plate having equidistant openings, which are covered by filters of different types in the aforesaid regular periodicity. Furthermore, the filter arrangement 12 can also additionally contain polarization filters, such as are needed for ink density measurements in order to eliminate the surface reflection of the printing inks.

In the embodiment illustrated in FIG. 1, the light-emitting diodes $L_1$ to $L_9$ are carried by a printed circuit board 13, on which the associated drive electronics are also accommodated. These will be discussed in more detail later.

As can be seen from FIG. 1, an illumination device according to the invention is suitable for building up a larger unit by joining linearly a plurality of identical illumination devices 2, 102 and 202. In the case illustrated, each of these illumination devices 2, 102 and 202 is respectively assigned a camera 1, 101 or 201, so that each camera 1, 101, and 201 together with its associated illumination device 2, 102, or 202 forms an image recording module 0, 100 and 200. Here, the areas of observation 5, 105 and 205 of the cameras 1, 101 and 201 adjoin one another without any substantial gaps or overlap one another a little, so that overall a coherent combined area of observation 5, 105, and 205 with about three times the length of each of the individual areas of observation 5, 105, and 205 is produced.

The illumination devices 2, 102 and 202 joined to one another are intended to illuminate the entire area of observation 5, 105, 205 without any gaps and uniformly in exactly the same way as a single illumination device of three times the length. For this purpose, the light sources 10 of each individual illumination device 2, 102 and 202 in each case comprise a whole number of periods, which, by way of example, is three in the illustrated case, and the spacing of the two outermost light-emitting diodes $L_1$ and $L_9$ from the end of the printed circuit board 13 is half the grid spacing of the light-emitting diodes $L_1$ to $L_9$. If two printed circuit boards 13 are joined directly to each other, the result is thus a gap-free and undisrupted continuation of the periodic arrangement pattern of the light-emitting diodes $L_1$ to $L_9$ to form a combined illumination unit of twice the length. The same applies in the same sense to the filter arrangement 12 as well, whose carrier plate has the same length as the printed circuit board 13. The cylindrical lenses 11A and 11B likewise have the same length.

Figure 4:
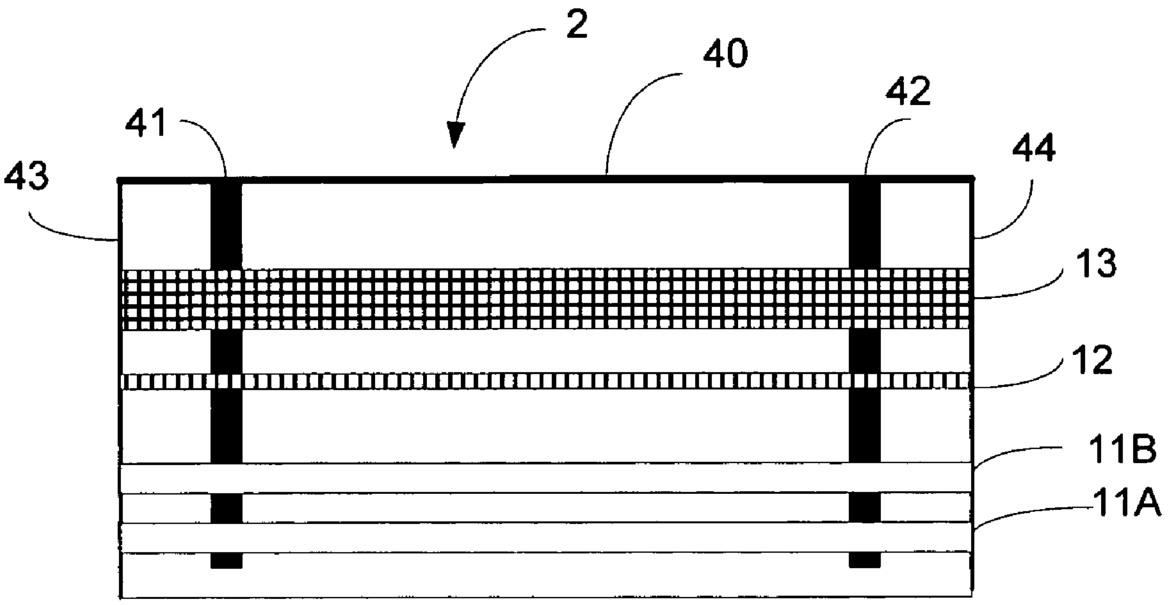
FIG. 4 shows in a schematic form an illumination device with a housing and holders for its optical components configured to allow two such illumination devices to be positioned in a row with no substantial gaps between their optical components.

Referring to FIG. 4, the printed circuit board 13, the filter arrangement 12, and the lenses 11A and 11B of the illumination device 2 are held in a housing 40 by holders 41 and 42. To facilitate a modular combination of a plurality of illumination devices to form a larger illumination unit, it is advantageous to configure the housing 40 and the holders 41 and 42 of its optical components in such a way that when two or more illumination devices of the same type are lined up laterally in a row the optical components of the individual illumination devices adjoin one another without any significant gaps. This includes, for example, the housing 40 and the holder 41 of the imaging optics not being able to interfere with or even block the light entry and exit from a possible adjacent module, so as not to interrupt the overlapping of the cones of light from the light sources in the transition region. Also, the side walls 43, 44 of the housing 40 should be designed to be sufficiently thin or partially removable, to permit the optical components of the illumination device 2 to be joined together without gaps to those of the adjacent illumination device, so that the suitable spacing of the light sources can be maintained even in the transition region. In the case of a periodic arrangement of light sources, this means that the periodicity is preserved in the transition region.

Here, returning to FIG. 1, in the case of an illumination device 102 which is adjoined on both sides by other illumination devices 2 and 202, both sides should be open in the region of the optical components, while in the case of illumination device 2 or 202 which terminates the larger unit 2, 102, 202 at one end, this needs to be the case only on one side. The housings, not illustrated in FIG. 1 for reasons of clarity, should also have suitable mechanical connecting devices for the firm connection with an alignment exactly flush with one another. The implementation of such connecting devices is familiar to those skilled in the art and therefore requires no explanation.

Although it is preferred that in each case a camera 1, 101 or 201 and an illumination device 2, 102 or 202, respectively, together form an image recording module 0, 100 or 200, it is also conceivable to assign a single camera a plurality of mutually identical illumination devices, which may be convenient when the area of observation of the camera is so large that its illumination with a plurality of modularly combined illumination devices is the more economical solution.

Joining together combined camera-illumination modules 0, 100, 200 and so on is aimed at being able to adapt the extent of the joint area of observation 5, 105, 205 and so on in its longitudinal direction flexibly, according to the different working widths of various types of press. A sufficient number of modules 0, 100, 200 and so on are provided, which overall have an area of observation 5, 105, 205 and so on which completely covers the maximum printable width of the printing material.

Figure 2:
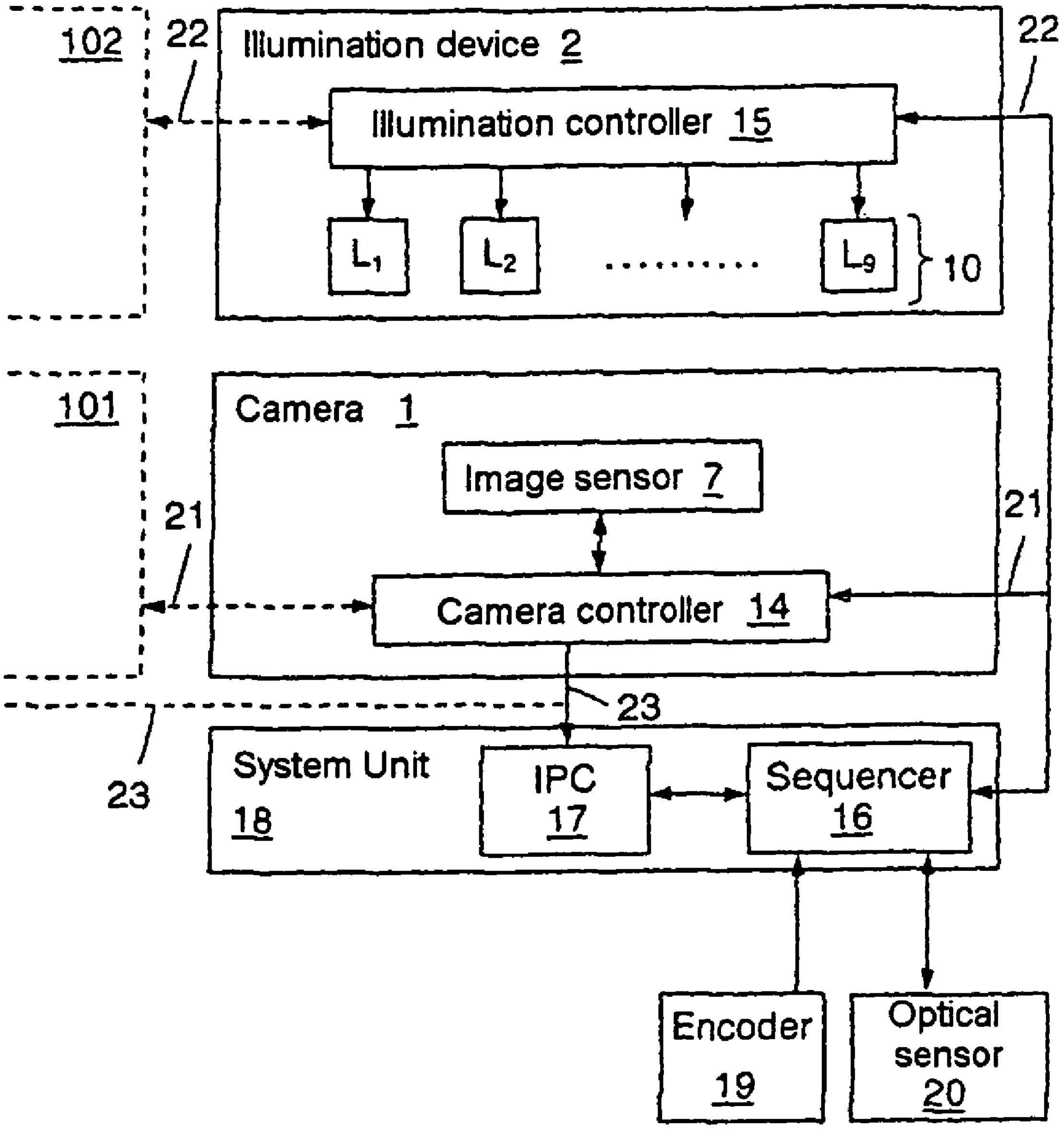
FIG. 2 shows an electric block diagram of an apparatus according to the invention.

An electric block diagram of an apparatus according to the invention is shown in FIG. 2. According to this embodiment, the image sensor 7 of the camera 1 is assigned a camera controller 14, which initiates the registration of images and reads a recorded image or part of the image from the image sensor 7. Likewise, apart from the light sources 10 in the form of the light-emitting diodes $L_1$ to $L_9$, an illumination controller 15 also belongs to the illumination device 2. The task of the illumination controller 15 is the brief activation, i.e., switching on and off, of the different groups of the light sources 10 in response to corresponding command signals from the sequencer 16. In addition, recording an image by means of the image sensor 7 and reading an image out of the image sensor 7 are triggered by the sequencer 16.

The actual image processing for the detection of the individual measurement areas 4 within the control strip 3 and the determination of characteristic data of the printed product to be examined from the images of these measurement areas 4, is carried out in real time in an image processing computer (industrial PC) 17 of appropriate power. The computer 17, just like the sequencer 16, is a constituent part of a higher-order system unit 18, which is present only once, irrespective of the number of cameras 1, 101, 201 and so on and illumination devices 2, 102, 202 and so on connected thereto.

The sequencer 16, whose core is a microcontroller, outputs its command signals to the illumination controller 15 and the camera controller 14 at the correct time. To that end, it receives sensor signals from a rotary encoder 19 and from an optical sensor 20. In this case, the rotary encoder 19 registers the rotational angle of a roll on which the printed product to be examined rests under tension during the recording of the image of the measurement strip 3 and whose circumferential speed consequently corresponds to the speed of movement of the printed product. The optical sensor is an optoelectronic sensor of simple construction, which is designed specifically for the detection of a predetermined mark on the printed product and which outputs a trigger signal when the said mark occurs in its area of observation. The position of this mark in relation to the measurement strip 3 is known, so that the sequencer 16 can use the trigger signal from the optical sensor 20 and the rotational angle signal from the encoder 19 to determine when a copy of the control strip 3 is located in the area of observation 5 of the camera 1 and can trigger the recording of an image at the correct time by sending appropriate command signals to the illumination controller 15 and the camera controller 14.

The lines 21 and 22 from the sequencer 16 to the camera controller 14 and to the illumination controller 15 are bus lines, to which it is possible to connect not just the controller 14 of a single camera 1 and the controller 15 of a single illumination device 2. Instead, these bus lines 21 and 22 can be led onwards to a large number of further cameras 101, 201 and so on, and, respectively, further illumination devices 102, 202 and so on, which can then all be triggered jointly by the sequencer 16. For this purpose, a further camera 101 and a further illumination device 102, and also the extensions of the bus lines 21 and 22, are indicated by dashed lines in FIG. 2. The controllers of the further cameras 101, 201 and so on are in this case also connected to the bus line 23 through which the recorded images are transmitted to the image processing computer 17 for processing.

In principle, during a single presence of the control strip 3 in the area of observation 5 of the camera 1, it would be possible for the sequencer 16 to activate all the spectral groups of light sources 10 one after another and, accordingly, to trigger a number of image recordings by the camera 1. However, this places extremely high requirements on the operating speed of the illumination device 2 and the camera 1, which can barely be met with an increasing number of printing inks to be measured, since a dedicated image has to be recorded for each color.

Therefore, the various colors are preferably measured one after another during successive presences of various copies of the control strip 3 in the area of observation 5 of the camera 1. This means that upon each arrival of a copy of the control strip 3, the sequencer 16 activates only a single spectral group of light sources 10 to emit a flash of light, and triggers only the recording of a single image. In order to measure all the colors, therefore, as many recordings are made one after another as there are colors to be measured. This sequential processing of the individual colors is repeated periodically. The frequency of measurement of each individual color is thus lower, by a factor corresponding to the number of colors to be measured, than the frequency of the occurrence of the control strip 3 in the area of observation 5 of the camera 1. However, a relatively large number of colors can be examined with high accuracy for this purpose.

In this connection, it should be mentioned that the spectral range suitable for the illumination is in no way restricted to the visible wavelength range. For example, for a selective black measurement, it may be necessary to illuminate the predetermined extract using infrared light. For the examination of printed products in which the printing material contains optical brighteners, illumination with ultraviolet light may be of interest. The special advantages of the present invention include the fact that the spectral properties of the illumination can be matched as required within wide limits to the respective measurement task.

In addition, the repeated reference to ink density measurements is not intended to mean that the invention would be suitable only for this purpose. Instead, it is equally well suited to a spectrophotometric color measurement, it being possible for the spectral range and the spectral resolution to be tailored specifically to the respective measurement task by means of the selection of the various spectral groups of light sources 10. Here, it is otherwise in principle also suitable not only to activate a single spectral group of light sources 10 at a specific time but also to activate a plurality simultaneously, in order to achieve a specific spectral composition of the light shone in by means of superimposition.

As far as the operation of the light sources 10 is concerned, the flashes of light output by the light sources firstly have to be dimensioned to be of such short duration that the control strip 3 does not move noticeably during a flash of light. Secondly, however, they must have sufficient intensity in order to ensure practical utilization of the dynamic range of the image sensor 7. These two requirements are opposed to one another at a given maximum luminous intensity of the light sources 10, and therefore need to be weighed up. In principle, therefore, the highest possible luminous intensity is desirable in order to be able to drive an image sensor 7 adequately with the shortest possible flash of light.

In the case of light-emitting diodes (LEDs) $L_1$ to $L_9$ as light sources, a considerable increase in the luminous intensity can be achieved by means of briefly increasing the current above the maximum value permissible for continuous operation. This is possible since the destruction of a light-emitting diode $L_1$ to $L_9$ by means of an excessively high current in continuous operation can primarily be attributed to thermal overloading as a result of the power loss converted into heat. If the current is supplied only in the form of very short pulses, then the maximum current specified for continuous operation of the light-emitting diode $L_1$ to $L_9$ can be far exceeded without a diode being damaged. It is necessary to ensure, of course, that the average power loss does not reach the thermal overloading threshold. At the frequencies of the light pulses to be output which are suitable in the present connection, increasing the current to 5 to 10 times the maximum current specified for continuous operation is possible, as a result of which the duration of the light pulses needed for adequate driving of the image sensor 7 may be shortened substantially. At a given maximum speed of the printed product, this permits correspondingly lower minimum requirements on the height of the control strip 3 and thus a saving in area.

Figure 3:
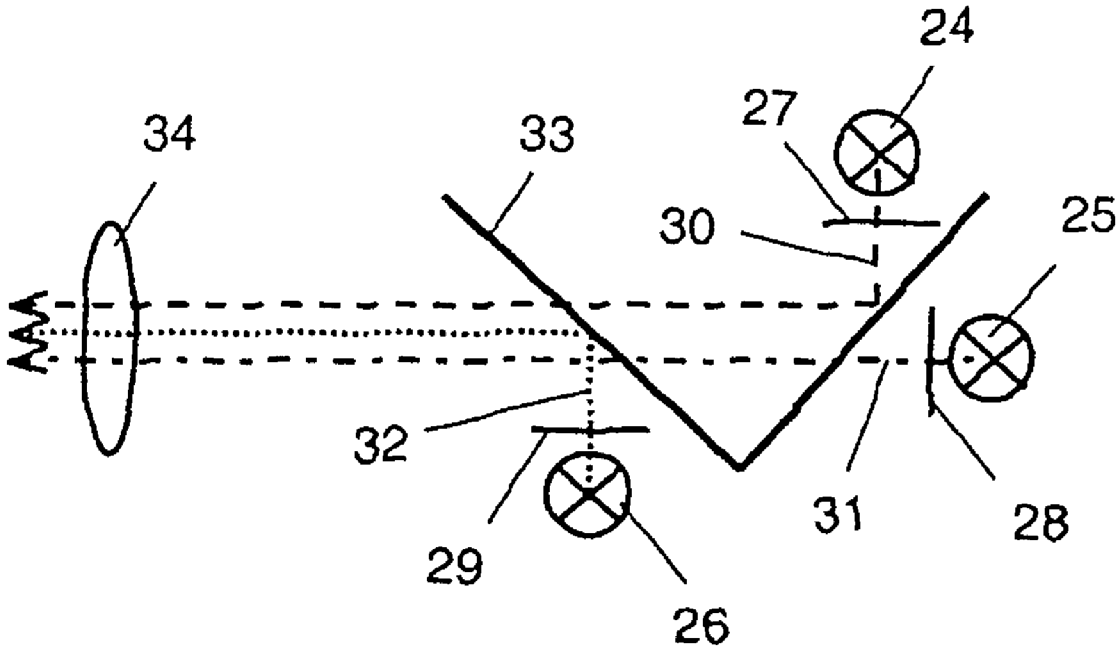
FIG. 3 shows an alternative embodiment of an illumination device which can be used for the invention in a schematic cross-sectional view.

To illustrate the fact that the implementation illustrated in FIG. 1 of the light sources 10 by means of light-emitting diodes $L_1$ to $L_9$ is not the only possible one, FIG. 3 shows an alternative implementation using gas discharge flash lamps 24 to 26. The flash lamps 24 to 26 are identical to one another and emit a broadband light that is approximately white. Each of the flash lamps 24 to 26 has a respectively different color filter 27 to 29 connected in front. For example, a red filter 27 is in front of the lamp 24, a green filter 28 is in front of the lamp 25 and a blue filter 29 is in front of the lamp 26.

The light beams 30 to 32 are filtered and therefore now spectrally differently composed. They are aligned in an approximately identical direction, namely at the area of observation of a camera, by means of a color-selective beam splitter 33. The red beam 30 and the blue beam 32 coming from different directions are deflected at different interfaces of the beam splitter 33 into approximately the same direction, in which the green beam 31 passes through the beam splitter 33 without reflection, this direction being the direction towards the area of observation of a camera. Imaging optics 34 can also be provided in the beam path after the beam splitter 33.

The mode of operation of optical beam splitters is well known and therefore does not require any explanation. The reason for the use of a beam splitter 33 lies in the larger dimensions of gas discharge lamps 24 to 26 in comparison with light-emitting diodes $L_1$ to $L_9$, for which reason such a high packing density cannot be achieved with gas discharge lamps 24 to 26. The lamps 24 to 26 and the filters 27 to 29 cannot therefore be arranged so close beside one another that their beams will be aimed virtually parallel to one another at a common target area. As in the embodiment with light-emitting diodes already described above with reference to FIG. 1, the number three of the various light colors is also only exemplary here and is not intended to limit the scope of the invention in any way.

Although the embodiment with light-emitting diodes $L_1$ to $L_9$ as light sources 10 described by using FIG. 1 is particularly preferred, the invention is, however, in no way restricted to the use of this specific type of light sources 10, as demonstrated by the last-described alternative embodiment of the light sources 10 as gas discharge lamps 24 to 26. However, the deflection explained by using FIG. 3 of the differently colored light beams into a common target direction is intrinsically independent of the type of light sources used. For example, the gas discharge lamps 24 to 26 could be replaced by rows of light-emitting diodes each of a standard light color. As compared with the arrangement according to FIG. 1, it would therefore be possible for the packing density of the light-emitting diodes of each color, and therefore also the luminous intensity of each color, to be increased approximately by the factor three, if the losses caused by the beam splitters are disregarded.

What is claimed is:

1. An apparatus for acquiring an image of a predetermined extract of a moving printed product within a printing press for printing of the printed product including the extract such that the extract is printed on sequential sheets during printing, the apparatus comprising:

at least one camera directed to an area of observation to capture images thereof, the camera being a black-and-white camera and having a two-dimensional image sensor that supplies intensity signals without color information;

an illumination device aimed at the area of observation for pulse-like illumination thereof during a series of occurrences of the predetermined extract of the printed product from the printing press in the area of observation, the illumination device having an area of illumination that completely covers the area of observation of the camera and being configured to selectively emit light within each of a plurality of spectral regions; and a control device for controlling the illumination device to sequentially illuminate the area of observation with a sequence of light pulses of different spectral compositions during passage of each of a corresponding sequence of pages, such that only one of the plurality of spectral regions is emitted for each one of the sequence of pages and such that only one spectral image is acquired during each occurrence of the predetermined extract of the printed product in the area of observation.

2. An apparatus as in claim 1, wherein the illumination device comprises a plurality of light sources that are arranged in a linear array at equal intervals.

3. An apparatus as in claim 1, wherein the illumination device comprises a plurality of light sources are arranged in a two-dimensional pattern having a plurality of equally spaced rows each having a plurality of equally spaced light sources.

4. An apparatus as in claim 1, wherein the illumination device comprises a plurality of light sources arranged in a periodic manner with a whole number of complete periods.

5. An apparatus as in claim 1, wherein the illumination device comprises a plurality of light sources arranged into at least two separate parallel rows disposed on opposite sides of the camera.

6. An apparatus as in claim 1, wherein each light pulse originates from at least two light sources of matching spectrum.

7. An apparatus as in claim 1, wherein the illumination device comprises a plurality of light sources, the apparatus further including color filters of different colors arranged in groups and disposed between the light sources and the area of observation.

8. An apparatus as in claim 7, further including at least one color-selective beam splitter disposed between the color filters and the area of observation for deflecting light beams from selected light sources towards the area of observation.

9. An apparatus as in claim 1, wherein the illumination device comprises a plurality of light sources, and the light sources are light emitting diodes or laser diodes.

10. An apparatus as in claim 1, wherein the illumination device comprises a plurality of light sources, and the light sources are gas discharge lamps or halogen incandescent lamps.

11. An apparatus as in claim 1, wherein the illumination device comprises a plurality of light sources, the apparatus further including imaging optics for directing light from the light sources to the area of observation.

12. An apparatus as in claim 11, wherein the imaging optics includes at least one cylindrical lens with an axial length corresponding approximately to a length of the pattern of the light sources.

13. An apparatus as in claim 1, wherein the illumination device has a housing and at least one holder for holding optical components of the illumination device, and wherein the housing and the holder are configured such that when the illumination device is lined up with and abutting a second illumination device of the same type the optical components of the illumination devices adjoin one another without a gap.

14. An apparatus as in claim 1, including a plurality of illumination devices and respective control devices, the illumination devices being arranged linearly beside one another to provide a strip-like continuous illumination area, there being light sources in the illumination devices forming an undisrupted pattern and being activated synchronously by respective control devices.

15. An apparatus as in claim 14, wherein each illumination device comprises a plurality of light sources, the apparatus further including a plurality of cameras disposed to correspond respectively to the plurality of light sources, the cameras being arranged linearly beside one another and parallel to the illumination devices.

16. A method of acquiring an image of a predetermined extract of a moving printed product from a printing press within a printing area, the extract being printed on each sequential page during printing, the method comprising:

directing at least one camera to an area of observation to capture images thereof, the camera being a black-and-white camera and having a two-dimensional image sensor that supplies intensity signals without color information;

aiming an illumination device at the area of observation for pulse-like illumination thereof during a presence of the predetermined extract of the printed product from the printing press, the illumination device comprising a plurality of light sources of distinct spectral groups for generating light of different spectral compositions, the light sources being arranged in a pattern such that the light sources of each spectral group form an arrangement with an area of illumination that completely covers the area of observation of the camera;

switching the spectral groups of light sources on and off sequentially whereby each spectral group is activated mutually exclusively of all other spectral groups for any one page of the printed product, such that the area of observation is illuminated with a periodic sequence of light pulses of different spectral composition during a corresponding sequence of distinct pages; and capturing with the camera a sequence of images of the predetermined extract of the printed product, each image in the sequence resulting from illumination by only a single spectral group per page of the printed product.

17. A method as in claim 16, wherein the light sources are light emitting diodes, and the step of switching applies current pulses to the light emitting diodes at a current level that is a multiple of a maximum current permissible for continuous operation of the light emitting diodes, the duration and spacing of the current pulses being set such that a maximum permissible average power of the light-emitting diodes is not exceeded.

18. A method as in claim 17, wherein the current level of the current pulses is at least five times the maximum current permissible for continuous operation of the light-emitting diodes.

* * * * *